United States Patent [19]

Kogure

[11] Patent Number: 4,721,851
[45] Date of Patent: Jan. 26, 1988

[54] IMAGE READING DEVICE USING FIBER OPTIC BUNDLES CONFIGURED DIFFERENTLY AT EACH END

[75] Inventor: Masaaki Kogure, Tokyo, Japan
[73] Assignee: Ricoh Company, Ltd., Tokyo, Japan
[21] Appl. No.: 856,355
[22] Filed: Apr. 28, 1986
[30] Foreign Application Priority Data Apr. 30, 1985 [JP] Japan ................................. 60-92767
Mar. 6, 1986 [JP] Japan ................................. 61-49375

[51] Int. Cl.$^4$ ............................................. H04N 3/02
[52] U.S. Cl. .................................... 250/227; 358/200
[58] Field of Search .............................. 250/227, 578; 350/96.24, 96.25; 358/212, 213, 200, 285, 293

[56] References Cited

U.S. PATENT DOCUMENTS 3,255,357  6/1966  Kapany ................................. 358/200
3,401,232  9/1968  Goldhammer ..................... 358/200
4,010,364  3/1977  Fuwa ................................... 358/200
4,409,477  10/1983  Carl ..................................... 250/227
4,616,266  10/1986  Hennig ............................. 350/96.24

Primary Examiner—David C. Nelms
Assistant Examiner—Stephone B. Allen
Attorney, Agent, or Firm—Oblon, Fisher, Spivak, McClelland & Maier

[57] ABSTRACT

An image reading device applies to a photoelectric transducer optical image data which are produced by scanning a document and samples the image data on a pixel basis to read images on the document. The device includes a fiber optic bundle comprising a plurality of optical fibers which are bound together such that their light inlet ends and light outlet ends are configured differently from each other. Optical image data from the document are propagated through the fiber optic bundle to the photoelectric transducer.

4 Claims, 13 Drawing Figures

| P(1,1) | P(1,2) | P(1,3) | P(1,4) | P(1,5) |
|--------|--------|--------|--------|--------|
| P(2,1) | P(2,2) | P(2,3) | P(2,4) | P(2,5) |
| P(3,1) | P(3,2) | P(3,3) | P(3,4) | P(3,5) |
| P(4,1) | P(4,2) | P(4,3) | P(4,4) | P(4,5) |
| P(5,1) | P(5,2) | P(5,3) | P(5,4) | P(5,5) |

| I(1,1) | I(1,2) | I(1,3) | I(1,4) | I(1,5) |
|--------|--------|--------|--------|--------|
| I(2,1) | I(2,2) | I(2,3) | I(2,4) | I(2,5) |
| I(3,1) | I(3,2) | I(3,3) | I(3,4) | I(3,5) |
| I(4,1) | I(4,2) | I(4,3) | I(4,4) | I(4,5) |
| I(5,1) | I(5,2) | I(5,3) | I(5,4) | I(5,5) |

Fig. 4

| -1 | -1 | -1 | -1 | -1 |
|----|----|----|----|----|
| -1 | -4 | -4 | -4 | -1 |
| -1 | -4 | 49 | -4 | -1 |
| -1 | -4 | -4 | -4 | -1 |
| -1 | -1 | -1 | -1 | -1 |

Fig. 5

| 1 | 1 | 1 | 1 | 1 |
|---|---|---|---|---|
| 1 | 3 | 3 | 3 | 1 |
| 1 | 3 | 12 | 3 | 1 |
| 1 | 3 | 3 | 3 | 1 |
| 1 | 1 | 1 | 1 | 1 |

| I(1) | I(2) | I(3) |
|------|------|------|

| P(1) | P(2) | P(3) |
|------|------|------|

| P(1,1) | P(1,2) | P(1,3) |
|--------|--------|--------|
| P(2,1) | P(2,2) | P(2,3) |
| P(3,1) | P(3,2) | P(3,3) |

| I(1,1) | I(1,2) | I(1,3) |
|--------|--------|--------|
| I(2,1) | I(2,2) | I(2,3) |
| I(3,1) | I(3,2) | I(3,3) |

IMAGE READING DEVICE USING FIBER OPTIC BUNDLES CONFIGURED DIFFERENTLY AT EACH END

BACKGROUND OF THE INVENTION

The present invention relates to a device for reading on a pixel basis images which are carried on an original document.

In an image recording and reproducing system of the type using a dot matrix printer, it is a common practice to optically scan an image-carrying surface of a document by a scanner to sample and read images on a pixel basis and, then, convert the resultant analog data to digital data, thereby producing digital image data. This process usually involves spatial filter processing which is an implementation for enhancing the quality of image recording. Specifically, the spatial filter processing is adapted to accentuate the edges of images to thereby compensate for blurring of images, or to smooth images.

The spatial filter processing uses a weighted $N \times N$ matrix and extracts each digital image data from a particular image area which has the same size as the matrix, i.e. $N \times N$, and has at its center a particular pixel to be processed (hereinafter referred to as an observed pixel). The digital image data and the weights of the filter are subjected to predetermined arithmetic operation to compensate the value of the digital image data of the observed pixel. A dilemmatic situation with such processing is that while the matrix size should desirably be increased to apply the processing to a wider pixel area to enhance the image quality, a larger matrix size results in the need for a correspondingly greater capacity of a buffer memory which serves to temporarily store each digital image data associated with a particular pixel area, as well as for a longer period of time for the operation. In practice, therefore, use is made of a matrix whose size is on the order of $3 \times 3$ sacrificing the image quality to a certain extent.

However, assuming that the document image sampling pitch is on the order of 62 $\mu$m (16 pixels/mm), for example, the spatial filtering with a $3 \times 3$ matrix is effective only for those image frequencies which are higher than 5 pixels/mm. To process image frequencies on the order of 1 to 3 pixels/mm which cover the peak of modulation transfer function (MTF) against eyesight, a spatial filter having a greater size such as $5 \times 5$, $7 \times 7$ or $9 \times 9$ is required.

SUMMARY OF THE INVENTION

It is therefore an object of the present invention to provide an image reading device which in the event of spatial filter processing of the kind described allows the processing to be performed easily and simply even if the matrix size is enlarged.

It is another object of the present invention to provide a generally improved image reading device.

A device for reading images carried on a document by sampling the images on a pixel basis of the present invention comprises a fiber optic bundle constructed by bundling a plurality of optical fibers each having a light inlet end and a light outlet at which optical image data produced by optically scanning the document in a main scan and a subscan directions enters and leaves the optical fiber, respectively, a light inlet end and a light outlet end of the fiber optic bundle which respectively are formed by the light inlet ends and the light outlet ends of the optical fibers being provided with configurations which are different from each other, and a photoelectric transducer for converting to an electric signal the optical image data which issue from the light outlet end of the optical fiber means.

The above and other objects, features and advantages of the present invention will become more apparent from the following detailed description taken with the accompanying drawings.

BRIEF DESCRIPTION OF THE DRAWINGS

FIG. 3A shows a spatial filter having a $5 \times 5$ matrix;

FIG. 3B shows an arrangement of digital image data in a particular $5 \times 5$ pixel area;

FIG. 4 shows an example of a spatial filter having a $5 \times 5$ matrix adapted to accentuate edges of images;

FIG. 5 shows an example of a spatial filter having a $5 \times 5$ matrix adapted to smooth images;

FIG. 6 shows digital image data which are stored in a buffer memory;

FIG. 7 shows an example of a spatial filter;

FIG. 11A shows a spatial filter having a $3 \times 3$ matrix; and

FIG. 11B shows an arrangement of image data in a particular $3 \times 3$ pixel area.

DESCRIPTION OF THE PREFERRED EMBODIMENTS

While the image reading device of the present invention is susceptible of numerous physical embodiments, depending upon the environment and requirements of use, substantial numbers of the herein shown and described embodiments have been made, tested and used, and all have performed in an eminently satisfactory manner.

Figure 1:
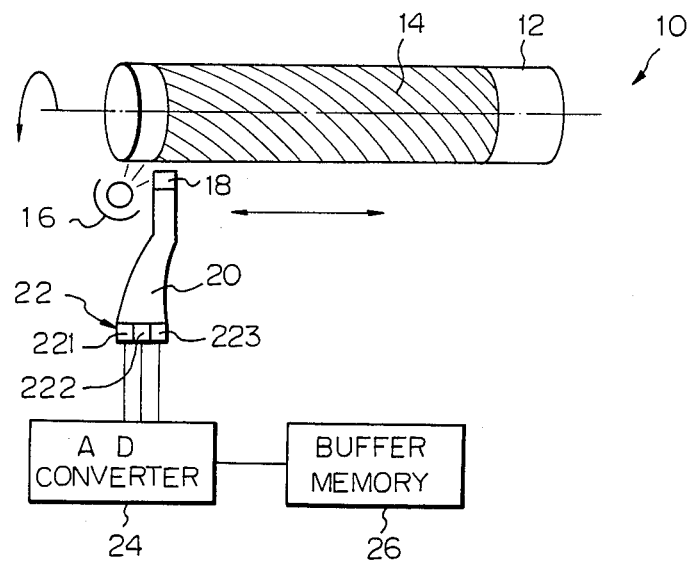
FIG. 1 is a schematic view of an image reading device in accordance with a first embodiment of the present invention.

Referring to FIG. 1, an image reading device embodying the present invention is shown and generally designated by the reference numeral 10. As shown, a document 14 is wrapped around a drum 12 which is rotatable in a main scan direction. As a lamp 16 illuminates an image-carrying surface of the document 14, a reflection is propagated through a SELFOC (trade name) lens 18 and a fiber optic bundle 20 to a photoelectric transducer 22 to be converted into an electric signal. In this manner, image data representative of the document 14 are sampled on a pixel basis. The output signal of the transducer 22 is quantized by an analog-to-digital (AD) converter 24 and, then, stored in a buffer memory 26. Although not shown in the drawing, a mechanism is provided for feeding the optics consisting of the lens 18, fiber optic bundle 20 and photoelectric transducer 22 in a subscan direction, i.e. along the axis of the drum 12.

Figure 2:
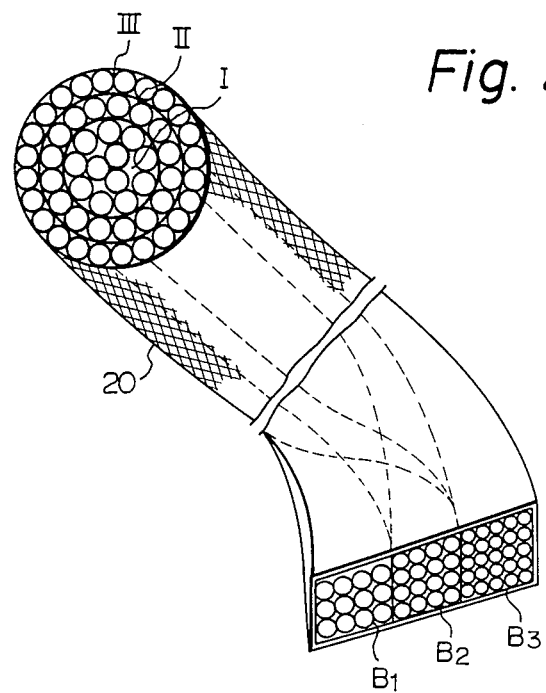
FIG. 2 is a view of a fiber optic bundle applicable to the first embodiment.

As shown in FIG. 2, the fiber optic bundle 20 comprises a plurality of optical fibers which are bound in such a unique configuration that at a light inlet end they form a plurality of concentric layers (in the illustrative embodiment, three concentric layers I, II and III) and, at a light outlet end, they form parallel rectangular blocks B1, B2 and B3 which correspond to the concentric layers I, II and III, respectively. In each of the blocks B1, B2 and B3, the optical fibers are arranged in a matrix. The photoelectric transducer 22 consists of three discrete transducer sections 221, 222 and 223 which are located to face the blocks B1, B2 and B3, respectively.

Figure 8:
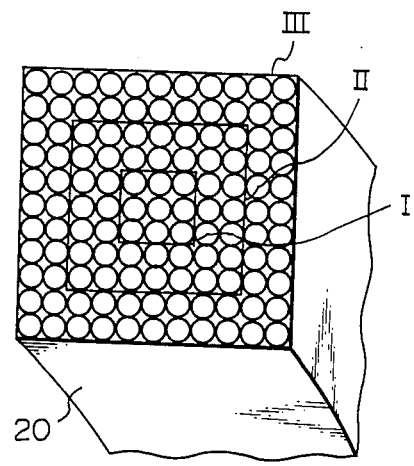
FIG. 8 is a view of another example of a fiber optic bundle.

It is to be noted that the circular configuration of the fiber optic bundle 20 at the inlet end is only illustrative. For example, as shown in FIG. 8, the optical fibers may be bundled in such a manner that each of the concentric layers I, II and III at the inlet end has a rectangular shape.

With the fiber optic bundle 20 and the photoelectric transducer 22 each having the above construction, the image reader 10 is capable of sampling image data on the document 14 based on three concentric areas and reading in parallel relation the sampled image data which respectively are associated with the discrete layers. The layers I, II and III may be provided with radii in a ratio of 1:1.4:1.7 in order to equalize the cross-sectional areas of the three layers to each other, although such does not constitute any essential part of the illustrative embodiment.

Edge accentuating processing which uses a spatial filter having a 5×5 matrix will be discussed.

It has been customary to use a 5×5 spatial filter made up of individually weighted pixels P(x, y) as shown in FIG. 3A, extract digitized pixel data I(x,y) in a particular 5×5 pixel area having at its center an observed pixel I (3,3) to be processed as shown in FIG. 3B, and produce processed data I'(3,3) of the observed pixel according to an equation:

$$I'(3, 3) = \sum_{i=1}^{5} \sum_{j=1}^{5} \{I(xi, yj) \times P(xi, yj)\} \quad \text{Eq. (1)}$$

In this manner, to perform edge accentuating processing by use of a 5×5 matrix spatial filter, the prior art system has to effect twenty-five times of multiplication using image data in the twenty-five pixels and the weights assigned to the pixels of the filter, and twenty-four times of addition for summing the products. In addition, a buffer memory which accommodates twenty-five pixels is essential in order to extract the digitized image data I(x,y) in the particular 5×5 pixel area.

FIG. 4 shows an example of 5×5 spatial filters adapted for edge accentuation. In this example, the matrix is provided with a weight distribution which is symmetrical with respect to the center of rotation. Specifically, the matrix consists of a center pixel to which a weight "49" is assigned, intermediate surrounding pixels to which the same weight "−4" is assigned, and outermost surrounding pixels to which the same weight "−1" is assigned.

An exemplary spatial filter for smoothing images which is also provided with a 5×5 matrix and a three-layer arrangement as the filter of FIG. 4 is shown in FIG. 5.

Thus, where the previously stated operation is implemented with a spatial filter having a 5×5 matrix in which three different weights are distributed in layers, if the total of each of the layers could be produced beforehand in order to allow the operation to be performed collectively layer by layer, the total operation time would be considerably shortened.

In light of the above, in this particular embodiment, the fiber optic bundle 20 is used to sample a particular 5×5 pixel area of the document 14 which has at its center an observed pixel to be processed. Then, optical image data representative of the observed pixel, a sum of optical data representative of those pixels which immediately surround the observed pixel, and a sum of optical data representative of the outermost surrounding pixels appear respectively at the blocks B1, B2 and B3 of the outlet end of the fiber optic bundle 20.

The optical data coming out through the blocks B1 to B3 of the bundle 20 respectively are converted by the transducer sections 221 to 223 of the photoelectric transducer 22 to electrical image data, then quantized individually by the AD converter 24, and then stored in the buffer memory 26. The respective quantized image data I(1), I(2) and I(3) associated with the blocks B1 to B3 are stored in the buffer memory 26 as shown in FIG. 6. That is, the buffer memory 26 with a capacity of equivalently three pixels stores image data associated with the observed pixel of the particular 5×5 image area, the sum of image data associated with the intermediate surrounding pixels, and the sum of image data associated with the outermost surrounding pixels.

In the above situation, therefore, edge-accentuated data I'(1) associated with the observed pixel can be attained by using, as shown in FIG. 7, a spatial filter P(x) having a 1×3 matrix which is weighted by pixels P(1), P(2) and P(3) according to the respective image data I(x), and performing an equation:

$$I'(1) = \sum_{i=1}^{3} \{I(xi) \times P(xj)\} \quad \text{Eq. (2)}$$

The values of the pixels P(1), P(2) and P(3) may be determined as P(1)=1, 0>P(2)>P(3).

Alternatively, they may be determined as P(1)=1, 1>P(2)>P(3)>0 in order to effect processing for smoothing images.

As described above, while the prior art system cannot complete space filter processing with a 5×5 matrix without performing twenty-five times of multiplication and twenty-four times of addition for summing the products, i.e., forty-nine times of operation in total, the illustrative embodiment of the present invention needs only three times of multiplication and two times of addition for summing the products, i.e., only five times of operation in total.

In the same manner, where a fiber optic bundle having a two-layer structure is used, image data associated with an observed pixel of a particular 3×3 pixel area and the sum of image data associated with the surrounding pixels can be produced in parallel. In this case, spatial filter processing using a 3×3 matrix can be implemented with only three times of operation, compared to the prior art which requires seventeen times of operation. Further, where a four-layer fiber optic bundle is used, image data associated with the observed pixel of a particular 7×7 pixel area and the sums of image data associated with the surrounding pixels can also be provided in parallel; spatial filter processing with a 7×7 matrix can be completed by only seven times of operation which is contrastive to ninety-seven times of operation otherwise required. In short, in the event of spatial filter processing using an n×n matrix, the illustrative embodiment drastically reduces the required frequency of operation to n/(2n²−1) thereby remarkably shortening the period of time necessary for spatial filter processing.

It will be seen from the above that in accordance with this particular embodiment where spatial filter processing is performed to enhance the quality of images such as to accentuate the edges or to smooth images, simple and easy arithmetic operation suffices even if the matrix size is increased to 5×5 or even to 7×7. Recording images by a printer and based on the processed data will significantly improve the quality of images.

Figure 9:
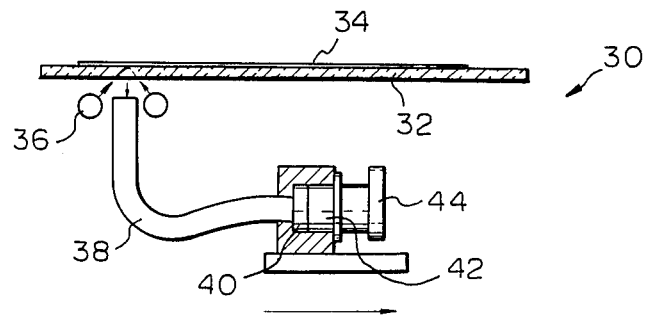
FIG. 9 is a front view of a second embodiment of the present invention.

Referring to FIG. 9, a second embodiment of the present invention is shown and generally designated by the reference numeral 30. As shown, a document 34 is laid on a glass platen of a document support 32. A lamp 36 illuminates an image-carrying surface of the document 34 line by line in a main scan direction, while a reflection from the document 34 which is representative of image data is propagated through a fiber optic array 38 to an ND filter 40 having an array configuration. Image data outputted by the ND filter 40 which have undergone spatial filter processing are transmitted through a SELFOC lens 42 to be read pixel by pixel by a line image sensor 44, which comprises charge coupled devices (CCDs) or other photoelectric transducer elements arranged in an array. The lamp 36, fiber optic array 38, ND filter 40, lens 42 and line image sensor 44 which constitute the optics in combination are fed in a subscan direction by a mechanism, not shown. If desired, the optics may be fixed in place, and the document support 32 fed in the subscan direction relative to the optics.

Figure 10:
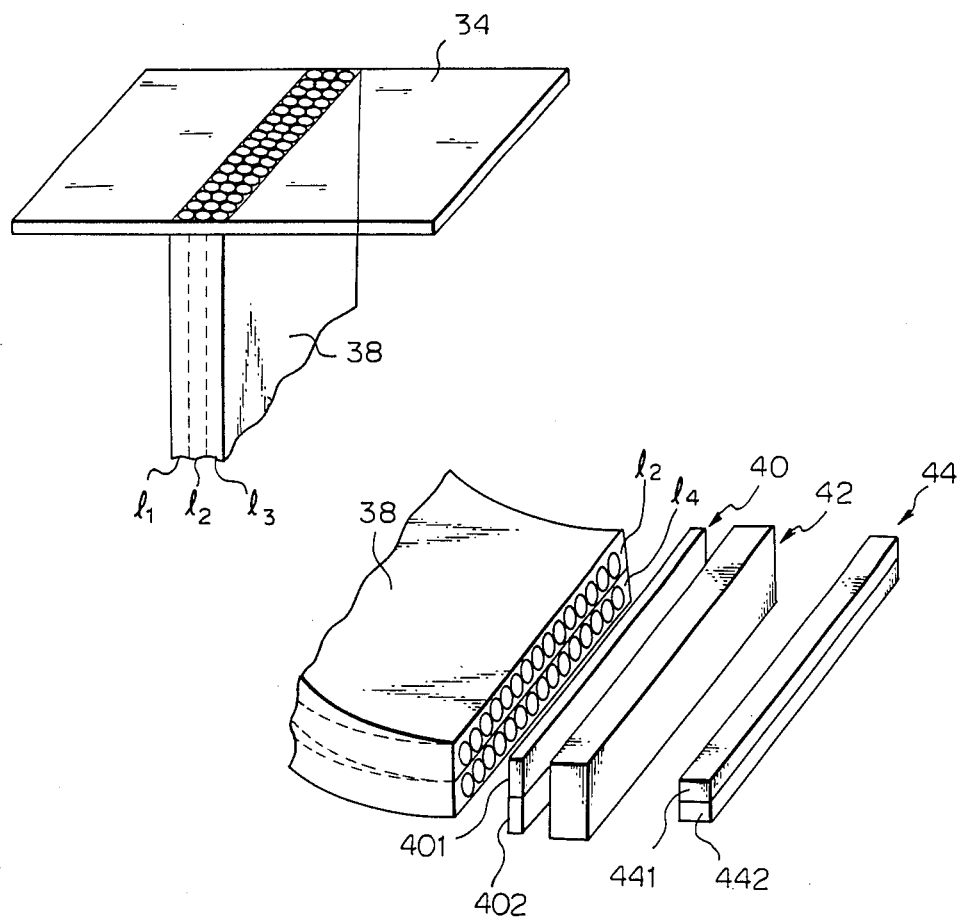
FIG. 10 is a perspective view of the construction shown in FIG. 9.

As shown in FIG. 10, the fiber optic array 38 is bundled such that at a light inlet side the ends of the optical fibers form three lines 11, 12 and 13 each extending in the main scan direction while, at a light outlet side, the intermediate line 12 appears as it is as a line 12 and the other two lines 11 and 13 are combined to appear as a single line 14. The ND filter 40 is made up of an ND filter 401 which is located to face the line 12 appearing at the outlet end of the array 38 and provided with transmissivity associated with a weighting coefficient P(1), and an ND filter 402 which is located to face the line 14 and provided with transmissivity associated with a weighting coefficient P(2). The light transmitted through the filter 401 is propagated through the lens 42 to reach a first line image sensor 441, and the light transmitted through the filter 402 is propagated through the lens 42 to reach a second line image sensor 442.

Assume a case wherein edge accentuating processing is performed by use of a spatial filter having a 3×3 matrix.

It has been customary to use a 3×3 spatial filter made up of individually weighted pixels P(x,y) as shown in FIG. 11A, extract digitized pixel data I(x,y) in a particular 3×3 pixel area having at its center an observed pixel I(2,2) to be processed as shown in FIG. 11B, and produce processed data I'(2,2) of the observed pixel according to an equation:

$$I'(2,2) = \sum_{i=1}^{3} \sum_{j=1}^{3} \{I(xi, yj) \times P(xi, yi)\} \quad \text{Eq. (3)}$$

In this manner, to perform edge accentuating processing by use of a 5×5 matrix spatial filter, the prior art system has to effect nine times of multiplication using image data in the nine pixels and the weights assigned to the pixels of the filter, and eight times of addition for summing the products. In addition, a buffer memory which accommodates nine pixels is essential in order to extract the digitized image data I(x,y) in the particular 5×5 pixel area.

In the image reader 30 having the above construction, optical image data produced by illuminating the document 34 is transmitted through the fiber optic array 38 so that, for each 3×3 pixel area in the main scan direction which has the observed pixel I(2,2) at the center, addition $$\sum_{i=1,3} I(i, 2)$$

of the pixels I(1,2) and I(3,2) which are positioned just above and just below the observed pixel I(2,2) is performed. The image data coming out along the line 12 of the fiber optic array 40 are passed through the ND filter 401, whereby multiplication I(2,2)×P(1) for weighting the observed pixel I(2,2) is performed. Further, the sum image data coming out along the line 14 of the array 38 are passed through the other ND filter 402 to be subjected to multiplication $$\sum_{i=1,3} I(i, 2) \times P(2)$$

for weighting the observed pixel I(2,2).

As described above, while the prior art system cannot complete space filter processing with a 3×3 matrix based on the Eq. (3) without repeating nine times of multiplication and eight times of addition for summing the products, i.e., seventeen times of operation in total, the image reader 30 of the illustrative embodiment needs only three times of multiplication and five times of addition for summing the products, i.e., only eight times of operation in total.

In an alternative configuration, a fiber optic array may have a light inlet end where optical fibers are arranged in five lines 11, 12, 13, 14 and 15 and a light outlet end where the intermediate line 13 appears as it is, the lines 12 and 14 immediately neighboring the line 13 are combined as one line, and so are the outermost lines 11 and 15. In such a case, ND filters having weighting coefficients P(1), P(2) and P(3), respectively, will be located to face the three lines at the outlet end of the array, filtered light being incident to line image sensors which are associated one with each of the filters. Then, in the event when spatial filter processing with a 5×5 matrix is effected, twenty-five times of multiplication and twenty-four times of addition for summing the products, i.e., forty-nine times of operation in total heretofore required are reduced to five times of multiplication and nine times of addition for summing the products, i.e., only fourteen times of operation in total.

Further, use may be made of a fiber optic array in which optical fibers are arranged in seven lines at the inlet end of the array and in four lines at the outlet end. This allows spatial filter processing with a 7×7 matrix to be completed by only seven times of multiplication and thirteen times of addition for summing the products, i.e., twenty times of operation in total, compared to forty-nine times of multiplication and forty-eight times of addition otherwise required.

In short, while spatial filter processing with an n×n matrix has heretofore been implemented with n² times of multiplication and (n²−1) times of addition for summing the products, i.e. ninety-seven times of operation in total, this particular embodiment drastically shortens the time period necessary for the processing in a ratio of $(3n-2)/(2n^2-1)$ to the prior art.

It will be seen that in accordance with the second embodiment of the present invention even if the matrix size used for spatial filter processing is enlarged to enhance the edge accentuating effect or the image smoothing effect, the arithmetic operation is partly implemented by optics while images on a document are being read, thereby promoting the ease of operation of a spatial filter.

Various modifications will become possible for those skilled in the art after receiving the teachings of the present disclosure without departing from the scope thereof.

What is claimed is:

1. A method of spatial processing of an image comprising the steps of:
   scanning the image with an optical fiber means which is constructed with a plurality of concentric layers at the inlet end thereof;
   converting the light received at the outlet end of said optical fiber means into discrete electrical signals one for each of said plurality of concentric layers of said optical fiber means;
   quantizing each of the electrical signals produced from the conversion of said light into said singal; and
   applying spatial filter processing to said quantized signals.

2. An apparatus for spatial processing of an image comprising:
   an optical fiber scanning means having a plurality of concentric scanning layers at the inlet end thereof to scan an image;
   a plurality of conversion means for converting the light transmitted by each of said plurality of concentric layers of said optical fiber means into discrete electrical signals;
   quantizing means coupled to said conversion means for quantizing the signal produced by said conversion means; and
   spatial filter processing means for scanning said quantized signals.

3. An apparatus as in claim 2 wherein said optical filter means has a circular cross-section at its inlet end.

4. An apparatus as in claim 2 wherein said optical filter means has a rectangular cross-section at its inlet end.

* * * * *